O. G. JONES.
VEHICLE FENDER.
APPLICATION FILED OCT. 9, 1920.

1,421,693.

Patented July 4, 1922.
3 SHEETS—SHEET 1.

INVENTOR
Omar G. Jones.
By W. W. Williamson
Atty.

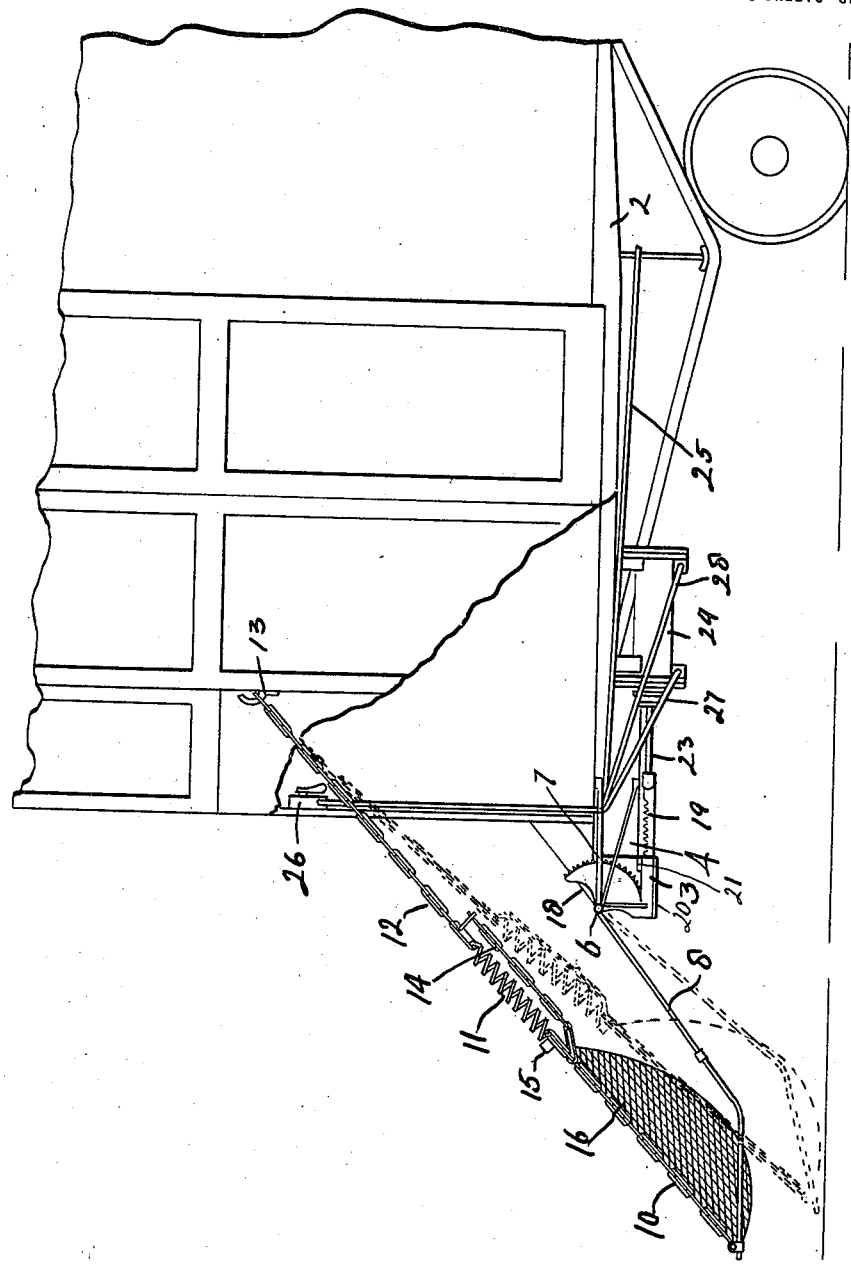

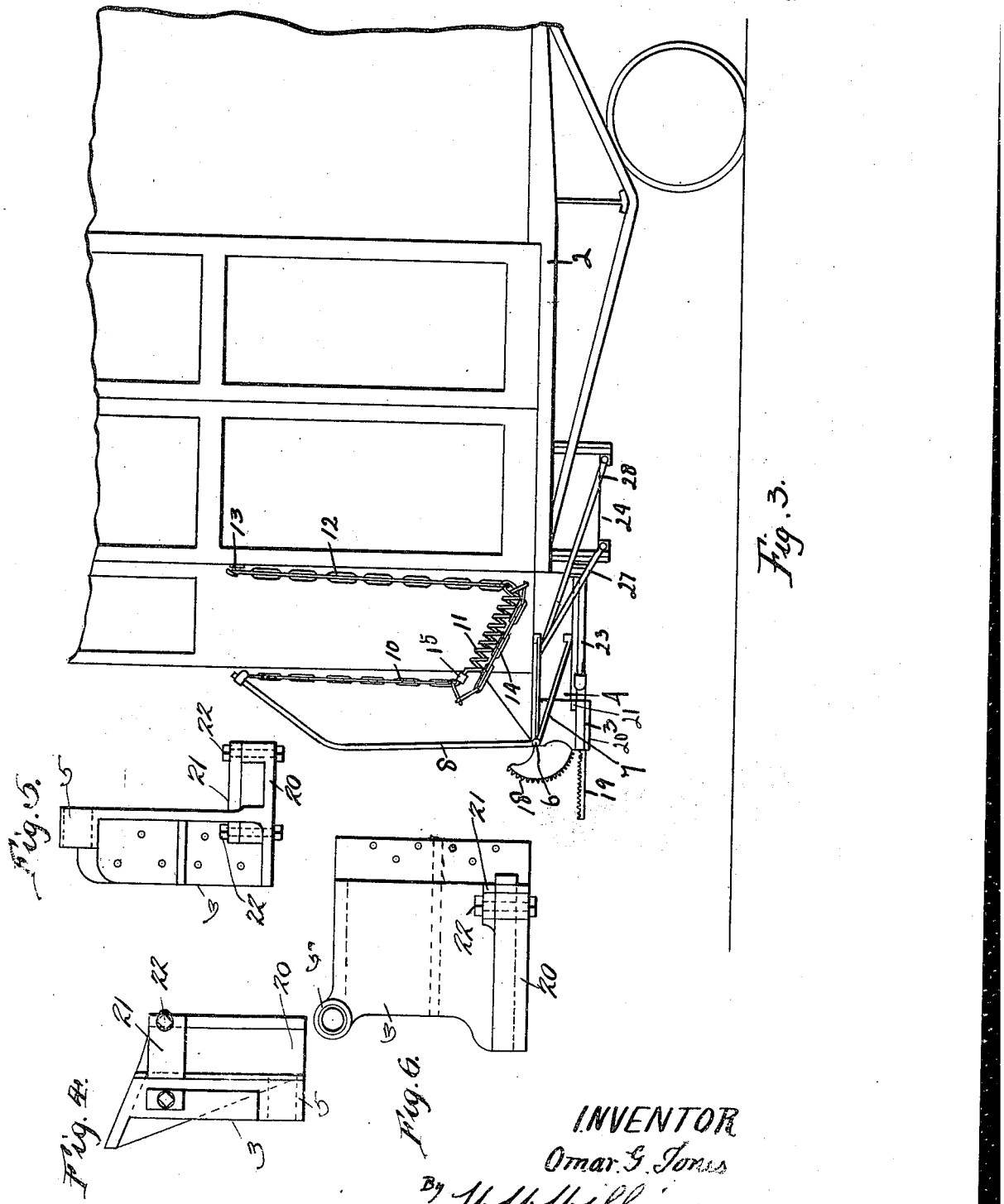

UNITED STATES PATENT OFFICE.

OMAR G. JONES, OF PHILADELPHIA, PENNSYLVANIA.

VEHICLE FENDER.

1,421,693.   Specification of Letters Patent.   Patented July 4, 1922.

Application filed October 9, 1920. Serial No. 415,849.

*To all whom it may concern:*

Be it known that I, OMAR G. JONES, a citizen of the United States, residing at Philadelphia, in the county of Philadelphia and State of Pennsylvania, have invented new and useful Improvements in Vehicle Fenders, of which the following is a specification.

My invention relates to a new and useful improvement in vehicle fenders, and has for its object to provide a fender under the control of the operator of the vehicle so that said fender may be moved from an inoperative position to a running position and to an operative position or vice versa as the occasion may require.

A further object of the invention is to provide mechanical actuating means for moving the fender to the different positions, said means being operated by compressed air, electricity or other suitable power.

A still further object of the invention is to provide means for automatically returning the fender to the running position from the operative position when the pressure is relieved from the actuating means.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 2, is a fragmentary side elevation of a car showing the fender carried thereby in running position a portion of said car being broken away to show certain mechanism therein and illustrating in dotted lines the operative position of the fender.

Fig. 3, is a similar view showing the fender in its inoperative position.

Fig. 4, is an enlarged plan view of the bracket in which the fender is journalled which acts as a bearing for the rack.

Fig. 5, is a front elevation thereof.

Fig. 6, is a side elevation thereof.

Figure 1:
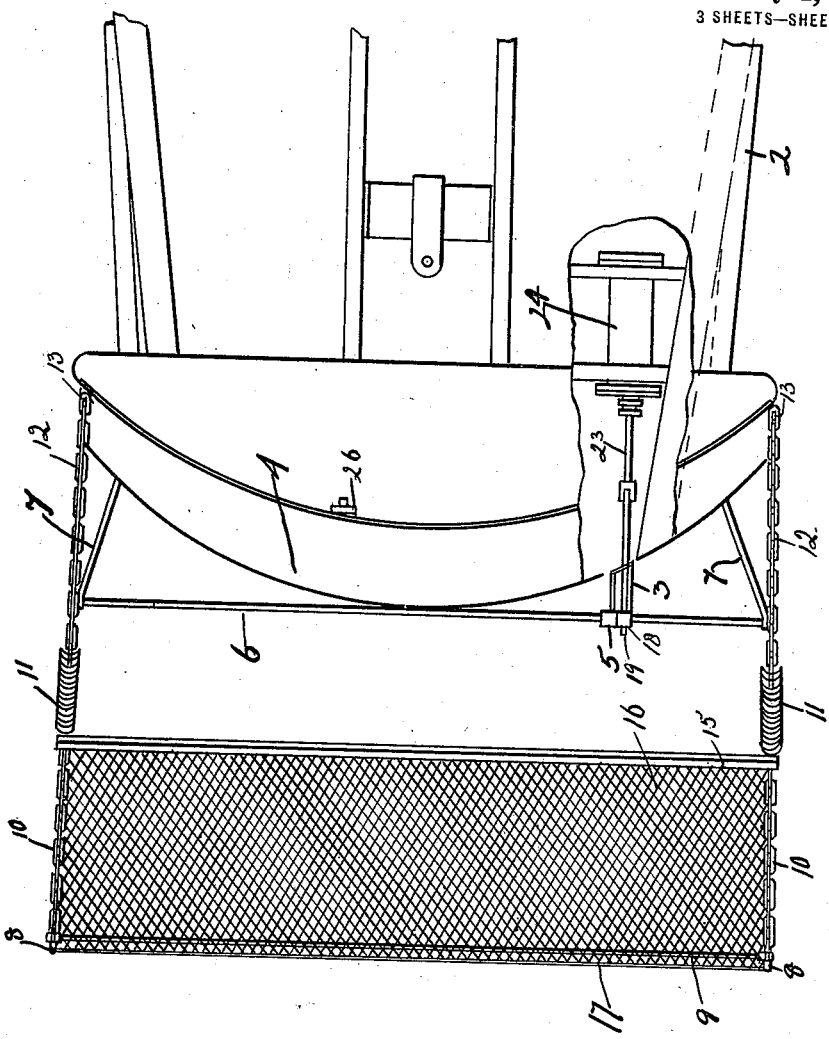
Fig. 1, is a fragmentary plan view of the frame of a street railway car showing my fender attached thereto, portions of said frame being broken away to show the actuating means.

In carrying out my invention as embodied in Figs. 1 to 6 inclusive, 2 represents a vehicle here illustrated as a street railway car having supporting brackets 3 secured thereto and preferably carried by the bumper 4 forming a part of the car frame, and these brackets each include a bearing 5 in which is journalled a transverse after bar 6 forming a part of the fender frame, the outer end of said after bar being braced, stiffened or further supported by the stay brackets 7 each consisting of two arms fastened to the bumper 4 adjacent the top and bottom thereof as shown in Fig. 2, and this after bar 6 has secured thereto adjacent its ends the side bars or members 8 of the fender frame the lower or outer ends of which are braced by a cross bar 9. To this frame preferably in the region of the ends of the cross bar 9 is secured one end of each of the chains 10 the opposite end of each of said chains being fastened to a spring 11 to which is also fastened one end of another chain 12, the opposite end of the last named chain being suitably fastened to the vehicle by means such as a hook 13, and to said chains 10 and 12 in the region of said spring is secured a chain 14 of greater length than the spring 11 when the latter is contracted as shown in Fig. 2.

Between the opposite chains 10 is arranged a fender net supporting piece or bar 15 to which is fastened the upper end of the fender net or catching member 16 the sides thereof being fastened to the chains 10 and the lower end to a cross piece 17 strung between the side members 8 of the fender frame, said cross piece 17 preferably being rope so as to reduce to a minimum the likelihood of injury to a person struck by the fender.

On the cross bar 6 is mounted a segmental pinion 18 which meshes with the rack bar 19 slidably mounted in the rack housing 20 of the bracket 3, said rack bar being held against accidental displacement by a cap 21 disposed across the housing and secured by bolts 22. The rack bar 19 is connected to the connecting rod 23 of the air cylinder 24 so that when air is supplied to the cylinder the rack bar will be actuated to move the fender to its different positions.

The numeral 25 represents an air line leading to the 3-way valve 26 from which run the pipes 27 and 28 to the forward and after ends respectively of the cylinder 24.

When the cars are stored or running in congested districts the fender may be raised to its inoperative position as shown in Fig. 3, but when it is desired to have it in condition for ready or immediate use it is moved to the position shown in full lines in Fig. 2 which is accomplished by manipulating the valve 26 so as to permit air from the air line 25 to pass through the pipe 27 into the forward end of the cylinder 24 which will cause the rack bar 19 to be drawn inward or rearwardly by rotating the segmental pinion 18 so as to lower the fender frame and when in the position shown in Fig. 2 the air is shut off which will cause the fender to remain in such position. If it becomes necessary to use the fender for picking up a person in the path of travel of the vehicle the valve 26 is again manipulated to cause air to flow into the forward end of the cylinder 24 which will further depress the fender frame until it assumes the position shown in dotted lines in Fig. 2 at which time the spring 11 will be distended until the chain 14 becomes taut which will limit the downward movement of the fender and prevent the same from coming in contact with the road bed or track. When it is desired to return the fender to its running position the pressure made in the cylinder 24 is relieved which will permit the spring 11 to retract and returning the fender to its normal running position.

When the fender is in either of its lower positions and it is desired to bring it to its inoperative position as shown in Fig. 3 the valve 26 is manipulated to permit air to pass from the line 25 through the pipe 28 to the cylinder 24 which will move the rack bar 19 outward a sufficient distance to raise the fender to the position shown in Fig. 3.

Of course I do not wish to be limited to the exact details of construction as herein shown as these may be varied within the limits of the appended claims without departing from the spirit of my invention.

Having thus fully described my invention, what I claim as new and useful is:—

1. A fender consisting of brackets for attachment to a vehicle, a cross bar journalled in said brackets, a fender frame fixed thereto, chains attached to said frame and the vehicle and springs interposed in said chains to normally maintain the distance between the points of attachment of said chains less than the length of said chains.

2. A fender consisting of brackets for attachment to a vehicle, a cross bar journalled in said brackets, a fender frame fixed thereto, chains attached to said frame and the vehicle, springs interposed in said chains to normally maintain the distance between the points of attachment of said chains less than the length of said chains, a catching member supported by said chains and fender frame and means for moving said fender frame to expand the spring and increase the distance between the points of attachment of the chains until equal to the full length of said chains.

3. A fender consisting of brackets for attachment to a vehicle, a cross bar journalled in said brackets, a fender frame fixed thereto, chains attached to said frame and the vehicle, springs interposed in said chains to normally maintain the distance between the points of attachment of said chains less than the length of said chains, a catching member supported by said chains and fender frame, an air cylinder, a connecting rod actuated therefrom, means for controlling the air supply to and from said cylinder, a rack bar attached to the connecting rod and slidably mounted in the brackets and a segmental pinion fixed to the cross bar and meshing with the rack bar whereby motion may be transmitted to the fender frame.

In testimony whereof, I have hereunto affixed my signature.

OMAR G. JONES.